United States Patent [19]
Kondo et al.

[11] Patent Number: 5,517,245
[45] Date of Patent: May 14, 1996

[54] HIGH EFFICIENCY ENCODING AND/OR DECODING APPARATUS

[75] Inventors: Tetsujiro Kondo; Hideo Nakaya, both of Kanagawa, Japan

[73] Assignee: Sony Corporation, Tokyo, Japan

[21] Appl. No.: 149,383

[22] Filed: Nov. 9, 1993

[30] Foreign Application Priority Data

Nov. 13, 1992 [JP] Japan .................. 4-303847

[51] Int. Cl.⁶ ................................. H04N 7/46
[52] U.S. Cl. ................................. 348/392; 348/424
[58] Field of Search ................. 348/424, 425, 348/392, 399, 409, 415; 364/724.1

[56] References Cited

U.S. PATENT DOCUMENTS

| | | | |
|---|---|---|---|
| 4,668,986 | 5/1987 | Furukawa | 348/416 |
| 4,788,589 | 11/1988 | Kondo | 348/415 |
| 4,891,699 | 1/1990 | Hamada et al. | 348/424 |
| 4,977,452 | 12/1990 | Enari et al. | 348/425 |
| 5,032,910 | 7/1991 | Cok | 348/392 |

*Primary Examiner*—Tommy P. Chin
*Assistant Examiner*—A. Au
*Attorney, Agent, or Firm*—Jay H. Maioli

[57] ABSTRACT

A high efficiency encoding device for compressing the input information by temporal/spatial sampling transmits the input information supplied at an input terminal 10 to a thinning sub-sampling unit 11 and to a normal equation generating unit 12a in a model-associated coefficient calculating unit, 12. The transmission information is supplied from the thinning sub-sampling unit 11 to an output terminal 13 and to the normal equation generating unit 12a. The normal equation generating unit 12a formulates normal equations by the least squares method based on a linear first-order combination model and outputs the coefficients to a coefficient calculating unit 12b. The coefficient calculating unit 12b solves the normal equations to find most probable values for the unknown coefficients to output the calculated most probable values to an output terminal 14.

4 Claims, 13 Drawing Sheets

|   |     |   |     |   |     |     |     |     |     |
|---|-----|---|-----|---|-----|-----|-----|-----|-----|
|$W_1$|   |$W_2$|   |$W_3$|   |$W_{14}$|   |$W_{15}$|   |
|   |$W_4$|   |$W_5$|   |$W_{16}$|   |$W_{17}$|   |$W_{18}$|
|$W_6$|   |$W_7$|   |$W_8$|   |$W_{19}$|   |$W_{20}$|   |
|   |$W_9$|   |$W_{10}$|   |$W_{21}$|   |$W_{22}$|   |$W_{23}$|
|$W_{11}$|   |$W_{12}$|   |$W_{13}$|   |$W_{24}$|   |$W_{25}$|   |

T0 (upper left), T2 (upper right)

|   |     |   |     |   |     |     |     |     |     |
|---|-----|---|-----|---|-----|-----|-----|-----|-----|
|   |$W_{26}$|   |$W_{27}$|   |$W_{38}$|   |$W_{39}$|   |$W_{40}$|
|$W_{28}$|   |$W_{29}$|   |$W_{30}$|   |$W_{41}$|   |$W_{42}$|   |
|   |$W_{31}$|   |$W_{32}$|   |$W_{43}$|   |$W_{44}$|   |$W_{45}$|
|$W_{33}$|   |$W_{34}$|   |$W_{35}$|   |$W_{46}$|   |$W_{47}$|   |
|   |$W_{36}$|   |$W_{37}$|   |$W_{48}$|   |$W_{49}$|   |$W_{50}$|

T4 (lower left), T6 (lower right)

| W1 | | W2 | | W3 | | W4 | | W5 | | W6 | | W7 | | W8 |
|---|---|---|---|---|---|---|---|---|---|---|---|---|---|---|
| | W9 | | W10 | | W11 | | W12 | | W13 | | W14 | | W15 | |
| W16 | | W17 | | W18 | | W19 | | W20 | | W21 | | W22 | | W23 |

T1

| | W24 | | W25 | | W26 | | W27 | | W28 | | W29 | | W30 | |
|---|---|---|---|---|---|---|---|---|---|---|---|---|---|---|
| W31 | | W32 | | W33 | | W34 | | W35 | | W36 | | W37 | | W38 |
| | W39 | | W40 | | W41 | | W42 | | W43 | | W44 | | W45 | |

T2

| W46 | | W47 | | W48 | | W49 | | W50 | | W51 | | W52 | | W53 |
|---|---|---|---|---|---|---|---|---|---|---|---|---|---|---|
| | W54 | | W55 | | W56 | | W57 | | W58 | | W59 | | W60 | |
| W61 | | W62 | | W63 | | W64 | | W65 | | W66 | | W67 | | W68 |

FIG.11

HIGH EFFICIENCY ENCODING AND/OR DECODING APPARATUS

BACKGROUND OF THE INVENTION

1. Field of the Invention

This invention relates to a high efficiency encoding apparatus for compressing the input information by space-time sampling for transmitting the compressed information, and a high efficiency decoding apparatus for decoding the compressed information.

2. Description of the Related Art

There has recently been proposed in the U.S. Pat. No. 4,703,352 a high efficiency encoding/decoding apparatus in which data containing a large quantity of information, such as data of the picture information, is encoded by a transmitting side and transmitted at an increased rate, and in which data received by the receiving side is decoded for generating picture information having a picture quality close to that of the original transmitted picture.

In the high efficiency encoding/decoding method, the two-dimensional picture is sampled in a two-dimensional space or by a temporal-spatial sampling. The thinned or sub-sampled information is encoded for transmission. Among the examples of temporal-spatial sub-sampling is a so-called multiple sub-Nyquist sampling encoding system as proposed by Japan Broadcasting Corporation (NHK).

With the transmission by this method, the information is sub-sampled at the encoding time for transmission. The decoder interpolates the sub-sampled information based on the received information to re-construct the information. As a matter of fact, the decoding of the picture transmitted in this manner is by interpolation of the non-transmitted picture information by fixed taps and filters of fixed coefficients based on the transmitted information.

If, however, the decoding is performed at the decoding side by the above-described hardware configuration, picture reconstruction may or may not be achieved effectively by the interpolation depending on the widely variable type of picture information, such as a picture with motion or a still picture. As a matter of fact, the decoded picture exhibits various problems, such as blurring, jerkiness indicating non-spontaneous movement or time-space fluctuations such as movements in an object of a decoded picture.

In general, if a picture in which the effects of the interpolation cannot be effectively introduced by the above-described fixed filter configuration, the picture on the receiving side experiences the above-described problems which deteriorate the picture quality significantly.

OBJECT AND SUMMARY OF THE INVENTION

In view of the above-described status of the prior art system, it is an object of the present invention to provide a high efficiency encoding/decoding device whereby the input information may be adaptively encoded with a high compression ratio irrespective of the type of the input information and the method of transmission. The transmitted information may be decoded by interpolation to produce the playback information without deterioration in the picture quality.

The high efficiency encoding device according to the present invention performs temporal/spatial sub-sampling on the input information and compresses the thinned information before transmitting the information. The high efficiency encoding device includes a thinning sub-sampling unit for thinning the input information and outputting the thinned information and a model-associated coefficient calculating unit. The coefficient calculating unit calculates unkown coefficients of an interpolation equation by solving a set of simultaneous equations for minimizing the errors between thinned-out information that is not sub-sampled from the input information and the result of interpolation. The equation of interpolation is used for finding the thinned-out information that is the object of interpolation using the transmission information not thinned out by the thinning means. The unknown coefficients of the equation are determined by solving the simultaneous equations to find the most probable value for the unknown coefficients. The high efficiency encoding device outputs the output information of the thinning sub-sampling unit and the coefficients from the model-associated coefficient calculating unit.

The high efficiency decoding device restores the original information by interpolating the information received from the high efficiency encoding device which has been thinned out. The temporal/spatial sub-sampling. The interpolation is performed on the received information containing transmitted pixels and coefficients. The high efficiency decoding device includes interpolation processing means for substituting the transmitted pixels and transmitted coefficients in association with the unknown coefficients of the equation of interpolation into a second equation of interpolation to find the information of the object of interpolation for restoring an original information, and time-series transforming means for transforming the information of the object of interpolation and the received information into time-series information corresponding to the original information.

The high efficiency encoding and/or decoding device employs the direct interpolating system of interpolating the center pixel and pixels on both sides of the center pixel.

The high efficiency encoding and/or decoding device performs temporal/spatial sub-sampling on the input information, compresses the sub-sampled information, transmits the resulting compressed information, receives the compressed information and interpolates the received information for restoring the input information. The high efficiency encoding and/or decoding device comprises a thinning sub-sampling means for thinning the input information and outputting the thinned information, a model-associated coefficient calculating unit for formulating simultaneous equations for minimizing the errors between the information concerning an object of interpolation resulting from the input information and the information concerning the results of interpolation obtained by interpolation by an equation of interpolation intended for finding the thinned-out information concerning the object of interpolation, using the transmission information not thinned out by the thinning sub-sampling unit, with the coefficients of the equation remaining unknown, add solving the simultaneous equations to find the most probable value for the unknown coefficients, a unit for generating the information concerning the object of interpolation by substituting the transmission information supplied by the thinning sub-sampling unit and determined coefficients which stand for the model-associated coefficient calculating unit into an equation for correction for generating the thinned information concerning the object of interpolation, and time-series transforming means for transforming the information concerning the object of interpolation as generated by the generating unit and the reception information into the time-series information corresponding to the input information.

The high efficiency encoding and/or decoding device performs temporal/spatial sub-sampling on the input information and compresses the resulting thinned-out information for transmitting the resulting information, while receiving the compressed information and interpolating the received information for restoring the input information. The encoding section of the high efficiency encoding and/or decoding device includes a thinning sampling unit for thinning the input information and outputting the resulting thinned information, a unit for calculating unknown coefficients by formulating simultaneous equations for minimizing the errors between the information concerning the object of interpolation resulting from the input information and the information concerning the results of interpolation obtained by interpolation by an equation of interpolation intended for finding the thinned-out information concerning the object of interpolation using the transmission information not thinned out by the thinning means, with the coefficients of the equation remaining unknown, and solving the simultaneous equations to find the most probable value for said unknown coefficients, and a unit for calculating the unknown coefficients of interpolation for calculating the most probable value for the unknown coefficients of interpolation. The calculating unit formulates simultaneous equations for minimizing an error between the reference information of the object of interpolation to be compared to the information of the object of interpolation obtained by calculation and the information concerning the results of interpolation obtained by the interpolation intended for generating the information of the object of interpolation which has not been taken as the object of interpolation in the calculating unit, using the transmission information from the thinning sub-sampling unit and the reference information concerning the object of interpolation, and solving the simultaneous equations for calculating the most probable values for the unknown coefficients of interpolation, wherein the unit for calculating the unknown coefficients of interpolation is connected in a cascaded manner downstream of the unknown coefficient calculating unit depending on the amount of thinning of the thinning sub-sampling unit for outputting a plurality of coefficients corresponding to the unknown coefficients. The decoding section of the high efficiency encoding and/or decoding device includes an interpolation processing unit having the transmission information and the plurality of coefficients entered thereto from the transmission means for generating the thinned-out information concerning the object of interpolation using the transmission information and one of the different coefficients, and time-series transforming means for transforming the information concerning the object of interpolation and the reception information into the time-series information corresponding to the pre-transmission information, with the interpolation processing unit and the time-series transformation unit being connected in cascade as one set depending on the number of the different kinds of coefficients, with the pre-transmission information being restored by the coefficients being employed by each unit in the set only for calculating the associated information concerning the object of interpolation.

By the multi-stage cascaded connection as described above, the high efficiency encoding and/or decoding device includes a cascaded connection of a unit for calculating the unknown coefficients for interpolation and a unit for calculating the unknown coefficients based on the transmission pixel information not thinned out and the input pixel information for transmission and reception of picture information by the two-stage hierarchical interpolation. For calculating the first coefficients which will minimize the residues between the information of the object of interpolation from the input information and the information of the results of interpolation for the information of the object pixel of interpolation, and second coefficients for the information of the object pixel of interpolation which has not been interpolated by the calculating unit for unknown coefficients of interpolation, the calculating unit for the unknown coefficients calculates the most probable value for the second coefficients which will minimize the residue between the input pixel information and the information of the result of interpolation as found from the information of the object pixel of information by interpolation.

If the thinning means is constituted by two-stage thinning, it is possible to output the coefficients which will minimize the residues between the input pixel information and the information of the results of interpolation from the information of the object pixel of interpolation thinned out for the first stage, that is, the above-mentioned second coefficients, and to output the coefficients which will minimize the residues between the input pixel information and the information of the results of interpolation from the information of the object pixel of interpolation thinned out for the second stage, that is, the above-mentioned first coefficients.

With the high efficiency decoding device, the transmission pixel information and the first and second coefficients as the reception information are coupled to the interpolation processing unit corresponding to the linear first-order combination model by two-stage cascade connection as in the encoding side. The first and second coefficients as found by the interpolation processing unit and the time-series transforming unit as one set are coupled in a cascaded manner. The picture which is substantially the same as the original picture is outputted from the information of the transmitted pixels and the information of the object pixel of interpolation obtained by interpolation.

The unknown coefficients are found from the result of addition of the information concerning the results of interpolation processing represented by the linear first-order combination of the transmission information not thinned by the thinning means and unknown coefficients and the residues between the information concerning the results of interpolation and the information concerning the object of interpolation obtained from the input information by the least squares method as a value which minimizes the residues.

BRIEF DESCRIPTION OF THE DRAWINGS

FIG. 7 shows a pattern of the pixel information employed for actual transmission in accordance with the pattern shown in FIG. 4.

FIG. 11 is a diagrammatic view showing the sampling pattern of the pixels shown in FIG. 10 in which pixel numbers are allocated to the pixels of the actual pixel pattern.

DETAILED DESCRIPTION OF THE PREFERRED EMBODIMENTS

The high efficiency encoding device of the present invention is hereinafter explained by referring to the schematic block diagram of FIG. 1. By way of an example, the high efficiency encoding device herein is applied to a picture processing device required to process a large quantity of data at an elevated speed.

The high efficiency encoding device comprises a thinning or sub-sampling unit 11 as thinning means for performing a thinning operation on the input picture information and outputting the sub-sampled picture information, and a model-associated coefficient calculating unit 12 as unknown coefficient calculating means. The model-associated coefficient calculating unit 12 formulates simultaneous equations which will minimize the errors between the information to be interpolated (the information that is the object of interpolation) that is obtained from the input information and the information resulting from the interpolation and solves the simultaneous equations to find the unknown coefficients. These unknown coefficients are those of an interpolation equation employed for finding the thinned-out reference information using the transmitted information which has not been thinned-out after the processing at the thinning sub-sampling unit 11.

The present embodiment employs a linear first-order coupled model. The model refers to a ½ frame dropping with sub-sampling in the time scale direction in describing a picture.

The model-associated coefficient calculating unit 12 is made up of a normal equation generating unit 12a for formulating normal equations as simultaneous equations by performing sub-sample extraction of the information of a region subject to the pre-defined model, and a coefficient calculating unit 12b for finding the unknown coefficients contained in the normal equations by the pixel information supplied from the normal equation generating unit 12a by coefficient calculation as later explained.

Figure 1:
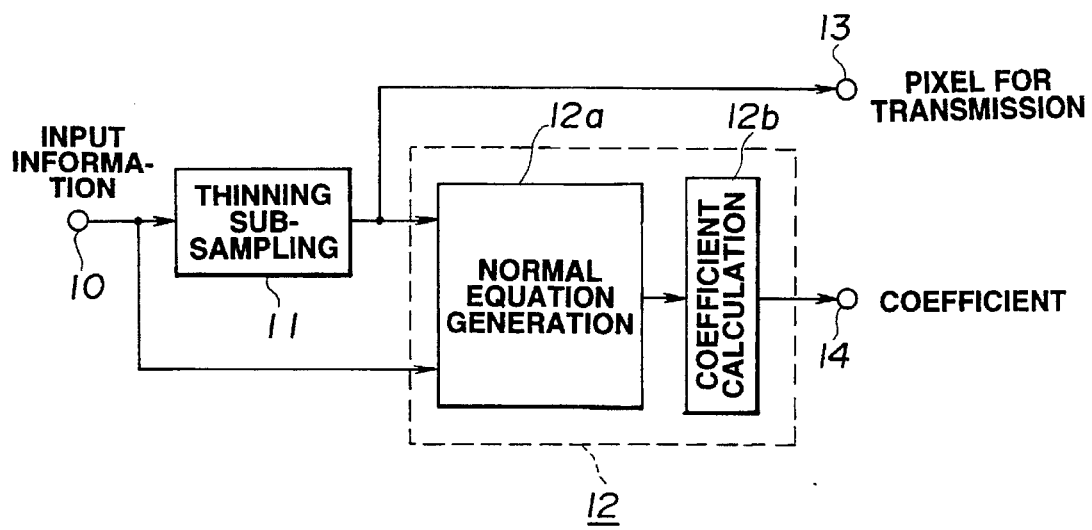
FIG. 1 is a schematic block diagram showing a high efficiency encoding device according to an embodiment of the present invention.

The interconnection of the high efficiency encoding device is explained by referring to FIG. 1.

The picture information corresponding to the input picture is supplied via an input terminal 10 to the thinning sub-sampling unit 11. The picture information is also supplied to the normal equation generating unit 12a of the model-associated coefficient calculating unit 12. The thinning sub-sampling unit 11 transmits encoded output signals as transmission pixels to a decoder via an output terminal 13 and a transmission cable, not shown, while also transmitting the encoded output signals to the normal equation generating unit 12a.

The model-associated coefficient calculating unit 12 performs time-series transformation on the transmission pixels supplied by the normal equation generating unit 12a and the input picture and model formulation corresponding to the linear first-order coupled model to generate the normal equations. The normal equation generating unit 12a outputs the coefficients of the generated normal equations to the coefficient calculating unit 12b. The coefficient calculating unit 12b performs matrix calculation on the unknown coefficients included in the supplied coefficients in accordance with the conditions imposed by the least squares method to transmit the calculated unknown coefficients to the decoder via transmission means, such as cables, not shown.

Figure 2:
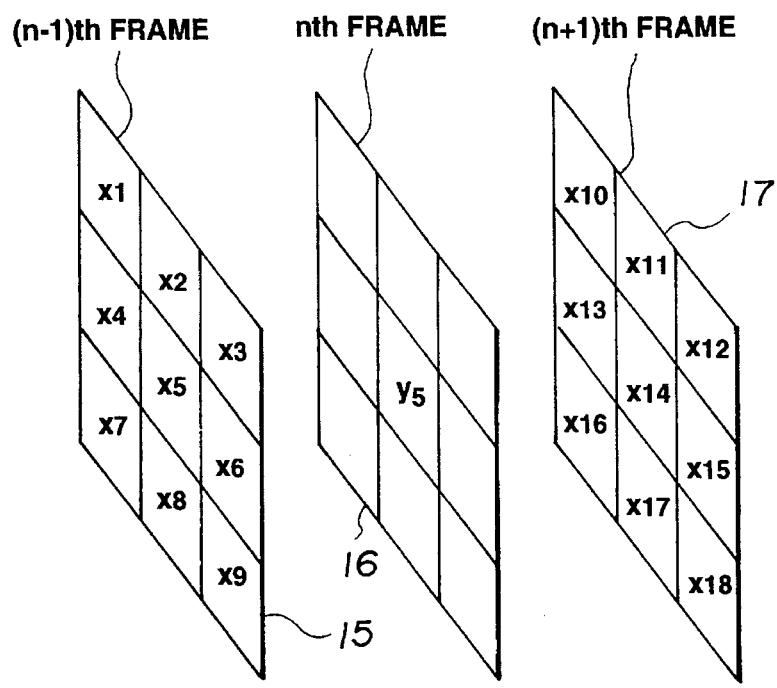
FIG. 2 is a diagrammatic view for illustrating the operating principle of the high efficiency encoding device based on the block diagram of FIG. 1.

The operating principle of the high efficiency encoding device is explained by referring to FIG. 2.

In the example shown in FIG. 2, when every other frame is dropped by sub-sampling along the time domain as described above to give a ½ frame system, a pixel y disposed at the center of an nth frame is found using pixels of an $(n-1)$th frame and an $(n+1)$th frame on either side of the nth frame.

In a previously defined space-time model, the $(n-1)$th to $(n+1)$th frames comprise blocks 15, 16 and 17 in the respective frames as one block. Of these, the blocks 15 and 17 are made up of nine input pixels $x_1$ to $x_9$ and $x_{10}$ to $x_{18}$, respectively. The model is represented by a linear first-order combination $x_i w_i$, that is, input pixels $x_i$ multiplied by coefficients $w_i$, where $i=1,\cdots 18$. The value $y_5$ at the center of the nth frame is represented by the linear combination $w^1 x_1 + w_2 x_2 + \cdots + w_{18} x_{18}$ of 18-tap input, pixels. The coefficients $w_i$ in the linear combination are determined so as to give the least residue between the pixel to be found by interpolation and the pixel as found by interpolation.

For finding the unknown coefficients $w_i$, the input pixels $x_i$, where $i=1,\cdots n$, and associated real pixels $y_j$, where $j=1,\cdots m$, are substituted into the linear combination when the input picture is shifted pixel by pixel in the spatial direction. If a set of coefficients is found for each frame in this manner, there are obtained a number of simultaneous equations in which the number of linear first-order combinations of the actual pixels y corresponding to the input pixels x and the unknown coefficients w corresponds to the number of pixels for one frame coefficient. By these simultaneous equations, corresponding matrices X, Y and a matrix of coefficients W are produced.

These matrices X, W and Y are expressed by $$X = \begin{pmatrix} x_{11} x_{12} \ldots x_{1n} \\ x_{21} x_{22} \ldots x_{2n} \\ \ldots \ldots \\ x_{m1} x_{m2} \ldots x_{mn} \end{pmatrix} \quad (1)$$

$$W = \begin{pmatrix} w_1 \\ w_2 \\ \cdot \\ \cdot \\ \cdot \\ w_n \end{pmatrix} \quad (2)$$

$$Y = \begin{pmatrix} y_1 \\ y_2 \\ \cdot \\ \cdot \\ \cdot \\ y_m \end{pmatrix} \quad (3)$$

The equation (4) of the linear first-order combination model represented by the matrices X, W and Y $$XW = Y \quad (4)$$

is an observation equation consisting of m simultaneous equations. The number of the simultaneous equations is significantly larger than the number of taps in pre-set two frames.

Basically, the unknown coefficients $w_i$ may be found by solving the observation equation. The method employed for finding the unknown coefficients $w_i$ is the least squares method. That is, the method for finding the unknown coefficients $w_i$ consists in adding a matrix of residues E $$E = \begin{pmatrix} e_1 \\ e_2 \\ \cdot \\ \cdot \\ \cdot \\ e_m \end{pmatrix} \quad (5)$$

to the right side of the observation equation. Addition of the matrix of residues E to the observation equation gives a residual equation.

$$XW = Y + E \quad (6)$$

In the least squares method, a matrix of coefficients W is found which gives the least value of the squares of the elements of the residue matrix E, that is, square errors.

The condition for finding the most probable value of the elements $w_i$ of the coefficient matrix W from the equation of the residues (6) is to satisfy a condition of minimizing the sum of the squares of m residues associated with the pixels in the block. This relation may be expressed by an equation (7)

$$e_1 \frac{\partial e_1}{\partial w_i} + e_2 \frac{\partial e_2}{\partial w_i} + \ldots + e_m \frac{\partial e_m}{\partial w_i} = 0 \quad (7)$$

By showing the residue equation, the unknown coefficients $w_1, w_2, \cdots w_n$ as the elements of the coefficient matrix W satisfying the n number of the above given conditions are found. Consequently, the equations (8)

$$\frac{\partial e_i}{\partial w_1} = x_{i1} \quad (8)$$

$$\frac{\partial e_i}{\partial w_2} = x_{i2}$$

$$\cdot$$

$$\frac{\partial e_i}{\partial w_m} = x_{im}$$

are found from the residue equation (6). If the conditions of the equation (7) are satisfied for each of n (i=1, $\cdots$ n), the equations (9)

$$\sum_{i=1}^{n} e_i x_{i1} = 0 \quad (9)$$

$$\sum_{i=1}^{n} e_i x_{i2} = 0$$

$$\cdot$$

$$\sum_{i=1}^{n} e_1 x_{im} = 0$$

are obtained.

From the equations (6) and (9), the normal equations $$\left( \sum_{j=1}^{m} x_{j1} x_{j1} \right) w_1 + \left( \sum_{j=1}^{m} x_{j1} x_{j2} \right) w_2 + \ldots + \left( \sum_{j1}^{m} x_{j1} x_{jn} \right) w_n = \sum_{j=1}^{m} x_{j1} x_j \quad (10)$$

$$\left( \sum_{j=1}^{m} x_{j2} x_{j1} \right) w_1 + \left( \sum_{j=1}^{m} x_{j2} x_{j2} \right) w_2 + \ldots + \left( \sum_{j=1}^{m} x_{j2} x_{jn} \right) w_n = \sum_{j=1}^{m} x_{j2} y_j$$

$$\cdot$$

$$\left( \sum_{j=1}^{m} x_{jn} x_{j1} \right) w_1 + \left( \sum_{j=1}^{m} x_{jn} x_{j2} \right) w_2 + \ldots + \left( \sum_{j=1}^{m} x_{jn} x_{jn} \right) w_n = \sum_{j=1}^{m} x_{jn} y_j$$

are obtained.

The equations (10) are simultaneous equations having a number of unknown values equal to n. In this manner, the unknown coefficients $w_i$ may be found as the most probable values. More precisely, the sum from j=1 to m of products $x_j, y_j$ of input pixels $x_{ij}$ in the equation (10), where i=1, 2, . . . , n and j= 1, 2, . . . , m, consists of a number of matrix elements. If the matrix is regular, the normal equation may be solved. The subscript i indicates the columns of the input pixel $x_{ji}$ for each column of the matrix elements the subscript i is changed. It is a regular equation generating unit 12a that performs a sequence of operations of finding the normal equations. The regular equation generating unit 12a outputs the coefficients in their entirety to the coefficient calculating unit 12b.

The coefficient calculating unit 12b finds the unknown coefficients $w_i$, using e.g. the Gauss-Jordan elimination method, or draining method, to solve the simultaneous equations. The coefficients calculating unit 12b outputs the coefficient $w_i$ as found to an output terminal 14.

If an optimum set of coefficients are found for each frame, as shown by an example of dropping of ½ frame in the present embodiment, the transmitted information is the pixels of every other frame and the coefficient set for each of the thinned-out frames. It should be noted that the amount of the coefficient information is negligible as compared to the amount of information of the pixels per frame. Thus the ratio of compression for ½ frame dropping is approximately ½.

Figure 3:
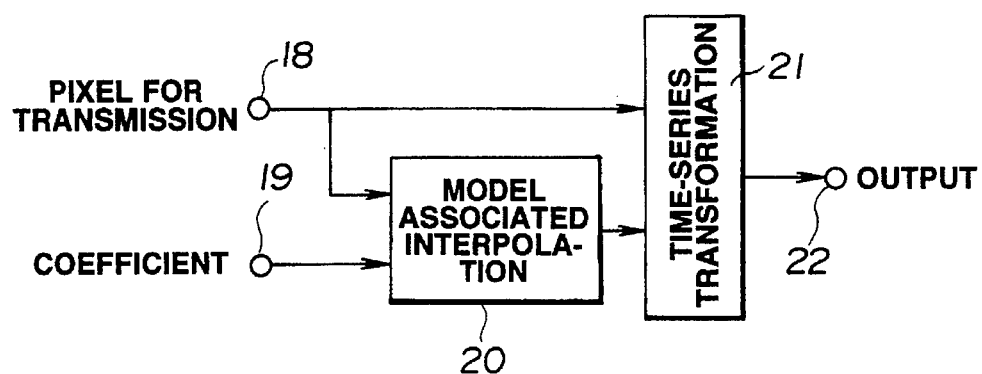
FIG. 3 is a schematic block diagram showing a high efficiency decoding device according to an embodiment of the present invention for use with the high efficiency encoding device shown in FIG. 1.

The high efficiency decoding device according to the present invention is explained by referring to the schematic block circuit diagram shown in FIG. 3.

The high efficiency decoding device is explained in connection with interpolating the received information thinned out by temporal-spatial sub-sampling and restoring the original information from the received information. In restoring the original information, the compressed information by ½ frame dropping is decoded by applying the linear first-order combination model to e.g. the picture processing device.

The high efficiency decoding device is made up of a model-associated interpolation processing unit 20 as interpolation processing means and a time-series transforming unit 21 as time-series transforming means. The interpolation processing unit 20 substitutes the non-thinned transmission information in the reception information and the elements $w_i$ of the coefficient matrix W of the transmitted coefficients corresponding to the unknown coefficients in the interpolation equation into the interpolation equation for finding the information of the object pixel of interpolation having the unknown coefficients to generate the information for restoring the transmitted original information. The time-series transforming unit 21 restores the time-series information corresponding to the pre-transmission information using the information of the object of interpolation generated by the model-associated interpolation processing unit 20 and the transmitted information.

The compressed picture information is the transmitted information which is supplied via an input terminal 18 to both the model-associated interpolation processing unit 20 and the time-series transforming unit 21. The elements $w_i$ of the coefficient matrix W, pre-calculated and transmitted by the transmitting side, are supplied via an input terminal 19 to the model-associated interpolation processing unit 20.

The model-associated interpolation processing unit 20 performs interpolation on the information supplied thereto using the linear first-order combination model, that is, a model which is the same as that used on the transmitting side.

The interpolating processing unit calculates the pixels of interpolation by the linear combination of the equation (4) from the set of the coefficients $w_i$ and the transmitted pixels. The model-associated interpolation processing unit 20 transmits the restored interpolated pixel to the time-series transforming unit 21.

The time-series transforming unit 21 causes the transmitted pixel lost by sub-sampling in the corresponding pixel position using the pixel transmitted to the temporal-spatial sampling position prior to transmission and the interpolated picture. The time-series transforming unit 21 achieves the restoration of the picture information by this transforming operation.

The above arrangement renders it possible to produce an interpolated pixel closer to the pre-transmission original picture than with the uniform filtering of the transmitted pixel subject to picture deterioration to restore the high efficiency compressed code data.

With the use of the high efficiency encoding device and the high efficiency decoding device, the data encoded and compressed with a high efficiency may be restored without substantially any deterioration by the transmission of the thinned-out transmission pixels and the unknown coefficients conforming to the linear first-order combination. The thinned-out pixels may be obtained by direct interpolation shown in FIG. 3.

Although the 3-frame 18-tap linear first-order combination model has been employed in the above-described embodiment, it is also possible to make processing by increasing the number of sub-sampling taps in the temporal/spatial directions.

Figure 4:
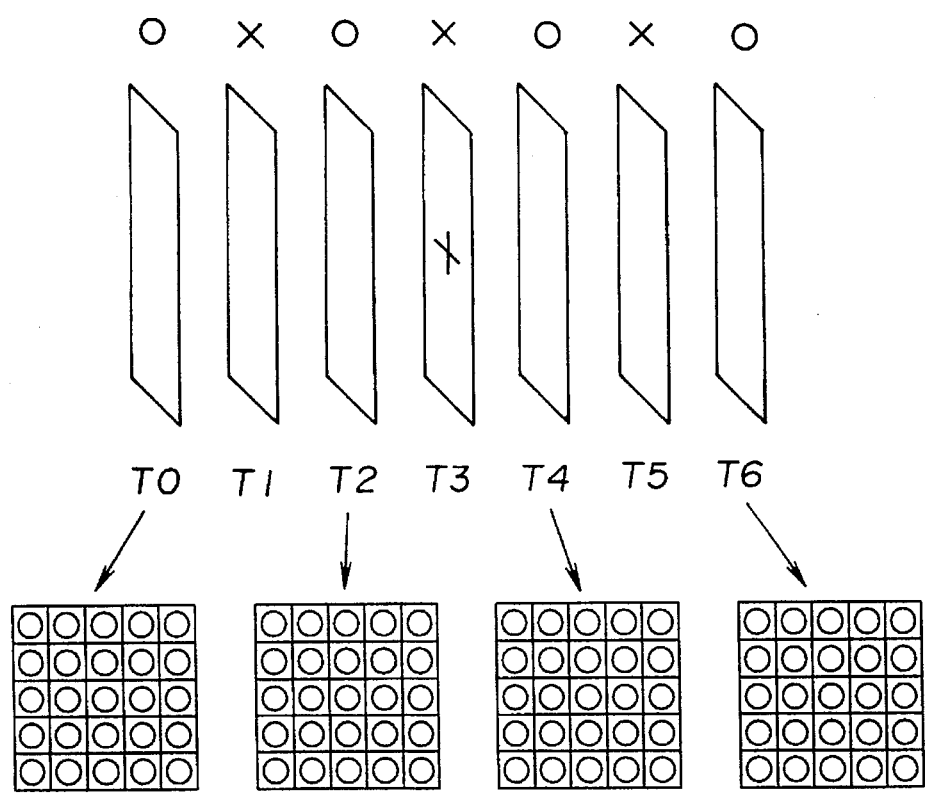
FIG. 4 is a diagrammatic view showing a pattern of pixels employed for coefficient calculation using pixels of four out of seven frames when transmitting the pixel information with ½ frame dropping with increase in the number of taps along the time scale.

If the number of taps along the time scale is increased and transmission is made with ½ frame dropping, all the pixels of even-numbered ones of seven frames T0 to T6 shown in FIG. 4, for example, are transmitted. Simultaneously, using 5×5 pixel blocks in a frame space of each of the even-numbered frames, pixel data at a position "+" of a non-transmitted frame T3 are calculated. Using a linear first-order combination model, represented by the product of the transmitted pixels and the unknown coefficients, the high efficiency encoding device calculates the coefficients transmitted to the high-efficiency decoding device.

Figure 5:
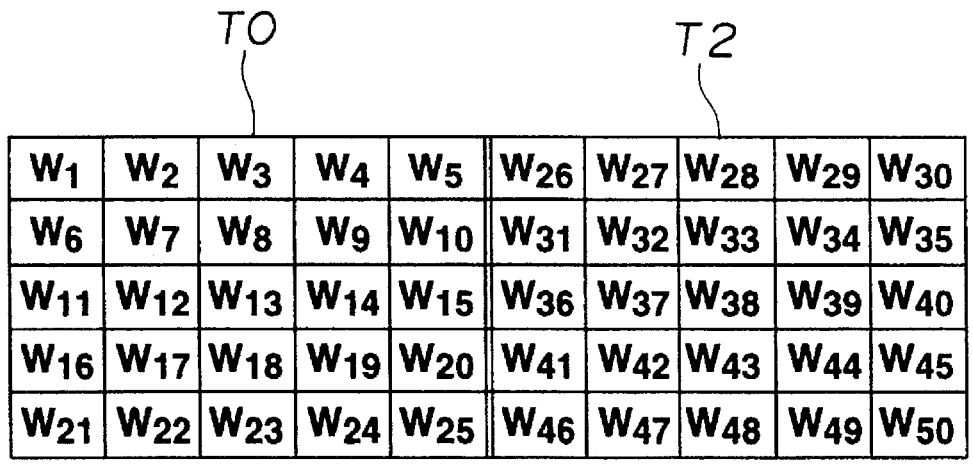
FIG. 5 shows a pattern of the pixel information employed for actual transmission in accordance with the pattern shown in FIG. 4.
Figure 5:
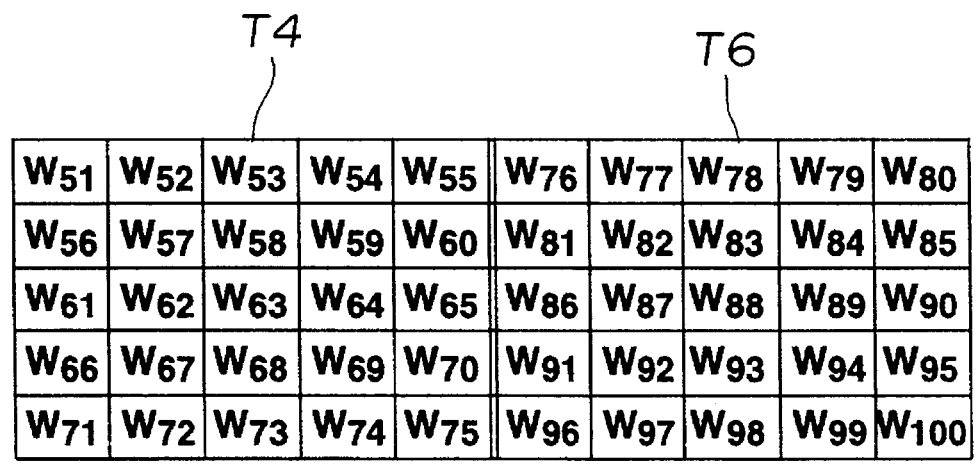

Among the seven frames T0 to T6, the frames employed in the calculation of the transmitted coefficients are the even-numbered frames T0, T2, T4 and T6 marked with O, as described above. Calculations are performed by the linear first-order model using 5×5 pixel blocks in the four frames. The coefficients actually transmitted are calculated using taps $w_1$ to $w_{100}$ of the frames T0, T2, T4 and T6 shown in FIG. 5, and decoding is performed in accordance with the linear first-order model based on the transmitted picture information and the coefficients.

Figure 6:
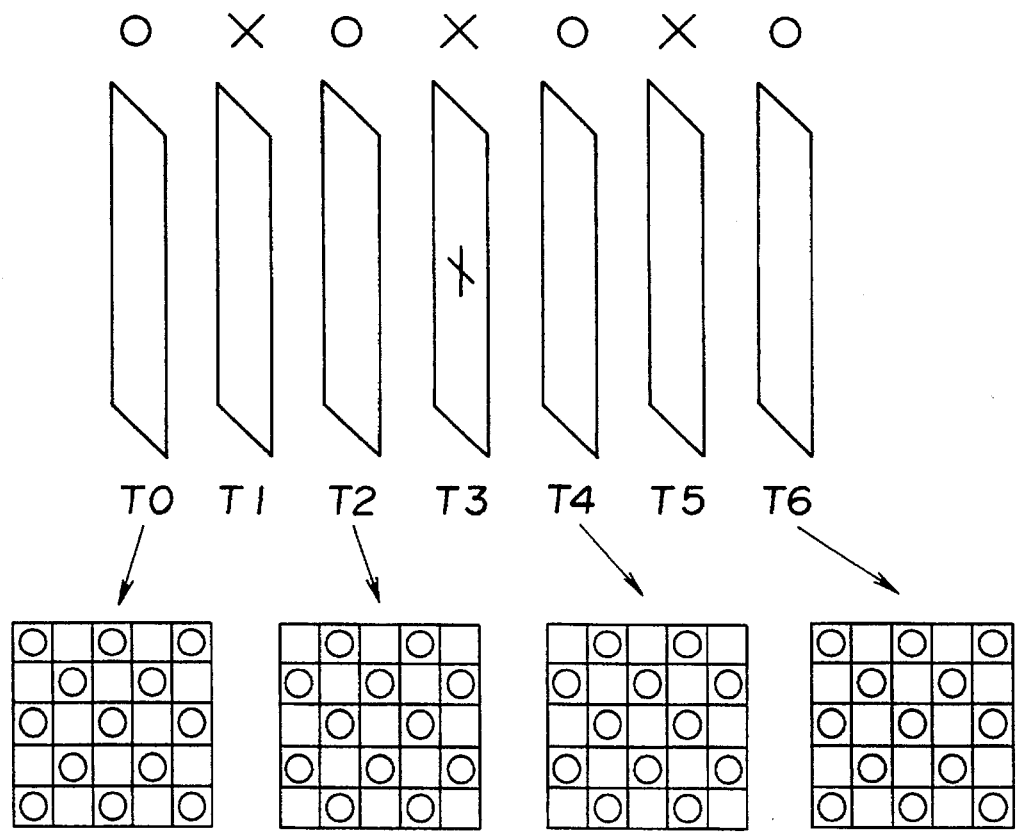
FIG. 6 is a diagrammatic view similar to FIG. 4 and showing an example of a sub-sampling pattern when transmitting the pixel information with ½ frame dropping.

In transmitting the seven frames T0 to T6 by ½ frame dropping, the even-numbered pixels of the seven frames T0 to T6 shown in FIG. 6 are transmitted. Simultaneously, unknown coefficients for data of a pixel at a position "+" of the frame T3 in a one-frame space are calculated for each of the even frames in association with the linear first-order combination model. As for the pixels employed for coefficient calculation in the linear first-order combination model, only the pixels at the positions O in FIG. 6 are thinned out in the space for calculating the unknown coefficients. Of the pixel array patterns obtained by thinning out in the space, there are two patterns, namely the frame patterns T0 and T6 and the frame patterns T2 and T4. In effect, pixels $w_1$ to $w_{50}$ of the four frames arrayed in a checkerboard pattern (T0, T2, T4 and T6 shown in FIG. 7) are employed.

In the previous embodiments, there is employed a set of unknown coefficients for each frame. However, a plurality of sets of coefficients may be employed for each frame by sub-dividing each frame in the space depending on the local features of a given picture.

Figure 8:
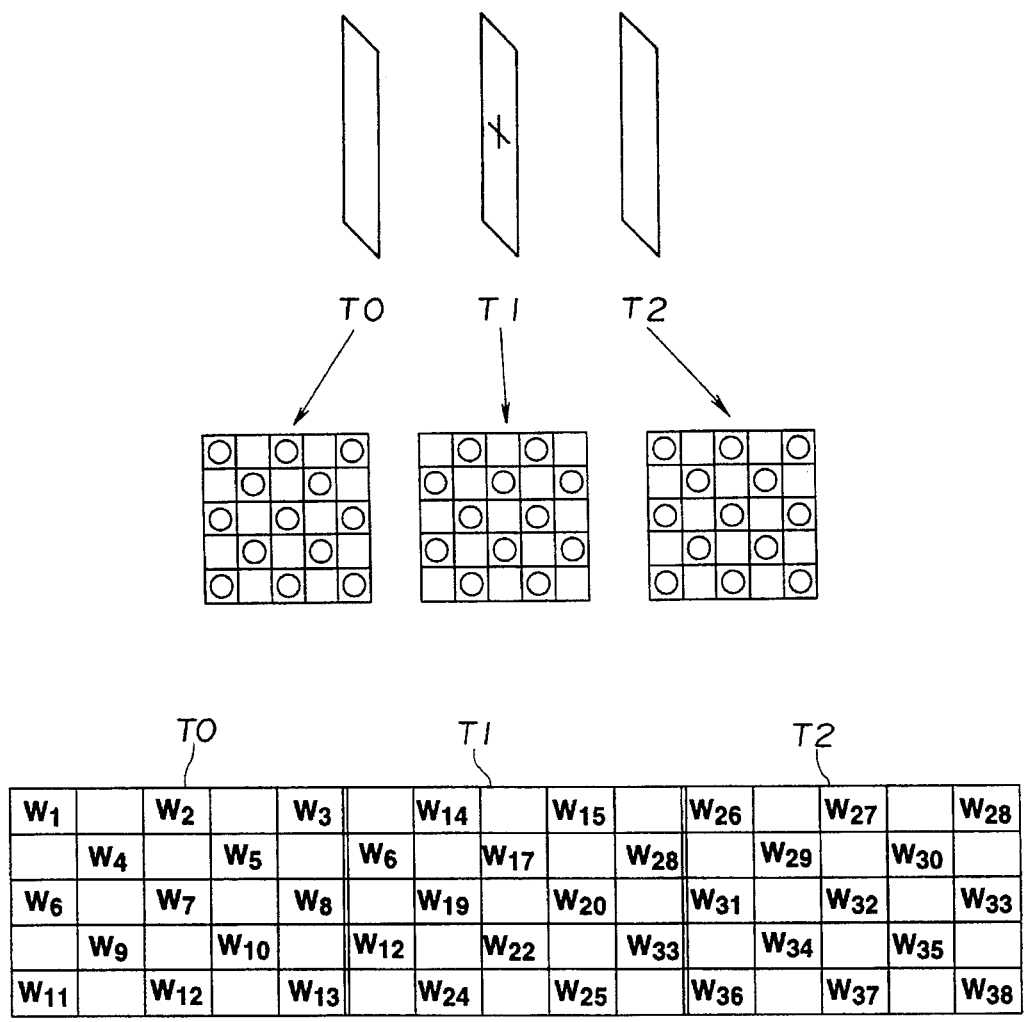
FIG. 8 is a diagrammatic view showing a pattern of pixels required for calculating the coefficients illustrating temporal-spatial thinning by ½ using three frames and an actual pixel pattern.

This concept is now applied to a temporal/spatial sub-sampling. For the ½ temporal/spatial sampling as described above, transmitted pixels are thinned by ½ of the total number of usual transmitted pixels of the frames T0, T1 and T2 shown in FIG. 8. The pixels employed for calculating the unknown coefficients are the patterns obtained by thinning out the transmitted pixels thinned out in the checkerboard pattern similar to the array of the transmitted pixels. As the pixel arraying patterns, the pixels in a given frame are sub-sampled in the checkerboard pattern with an offset from frame to frame. In effect, the pixels employed for calculating the unknown coefficients are 13 pixels $w_1$ to $w_{13}$ for frame T0, 12 pixels $w_{14}$ to $w_{25}$ for frame T1 and 13 pixels $w_{26}$ to $w_{38}$ for frame T2 shown in FIG. 8. Sub-sampling of 13 pixels and sub-sampling of 12 pixels are alternately carried out in accordance with the above-described thinning-out pattern for every other frame for carrying out the calculation of unknown coefficients in association with the model.

Figure 9:
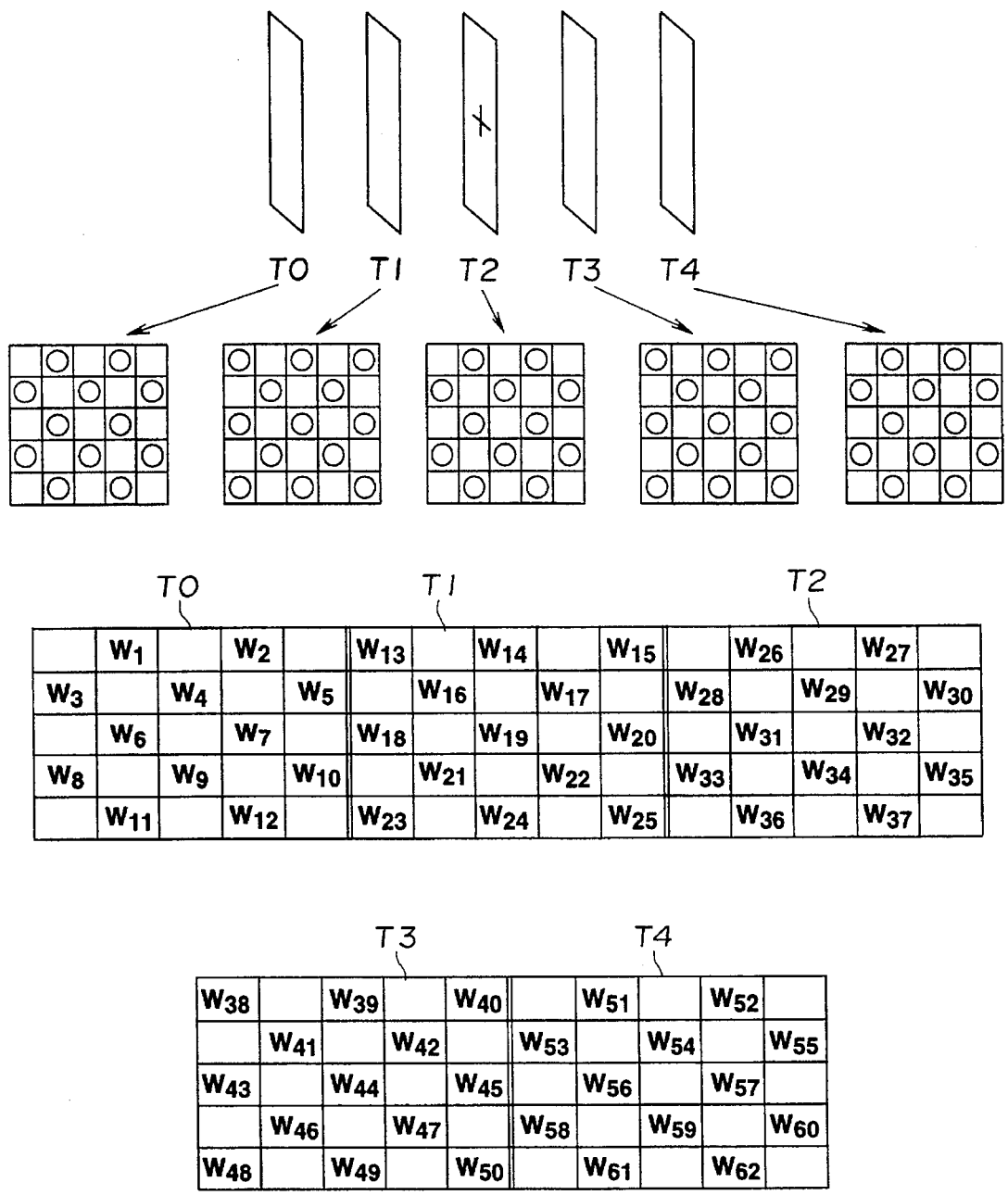
FIG. 9 is a diagrammatic view showing an actual pixel pattern and a pattern of pixels required for coefficient calculation in case the number of taps is increased along the time domain and an offset is made for each frame by way of sub-sampling in a checkerboard pattern.

If the number of taps is to be increased along the time scale, the five frames T0, T1, T2, T3 and T4 shown in FIG. 9 are employed and sub-sampling is performed in a checkerboard pattern with an offset for every other frame. In such case, 12 pixels are employed for even frames T0, T2 and T4 and 13 pixels are employed for odd frames T1, T3 and T5, for calculating the unknown coefficients. In such case, a sum total of 62 pixels are employed for a model and the same pixels as those employed for coefficient calculation are transmitted and processed with ½ temporal/spatial sampling.

Figure 10:
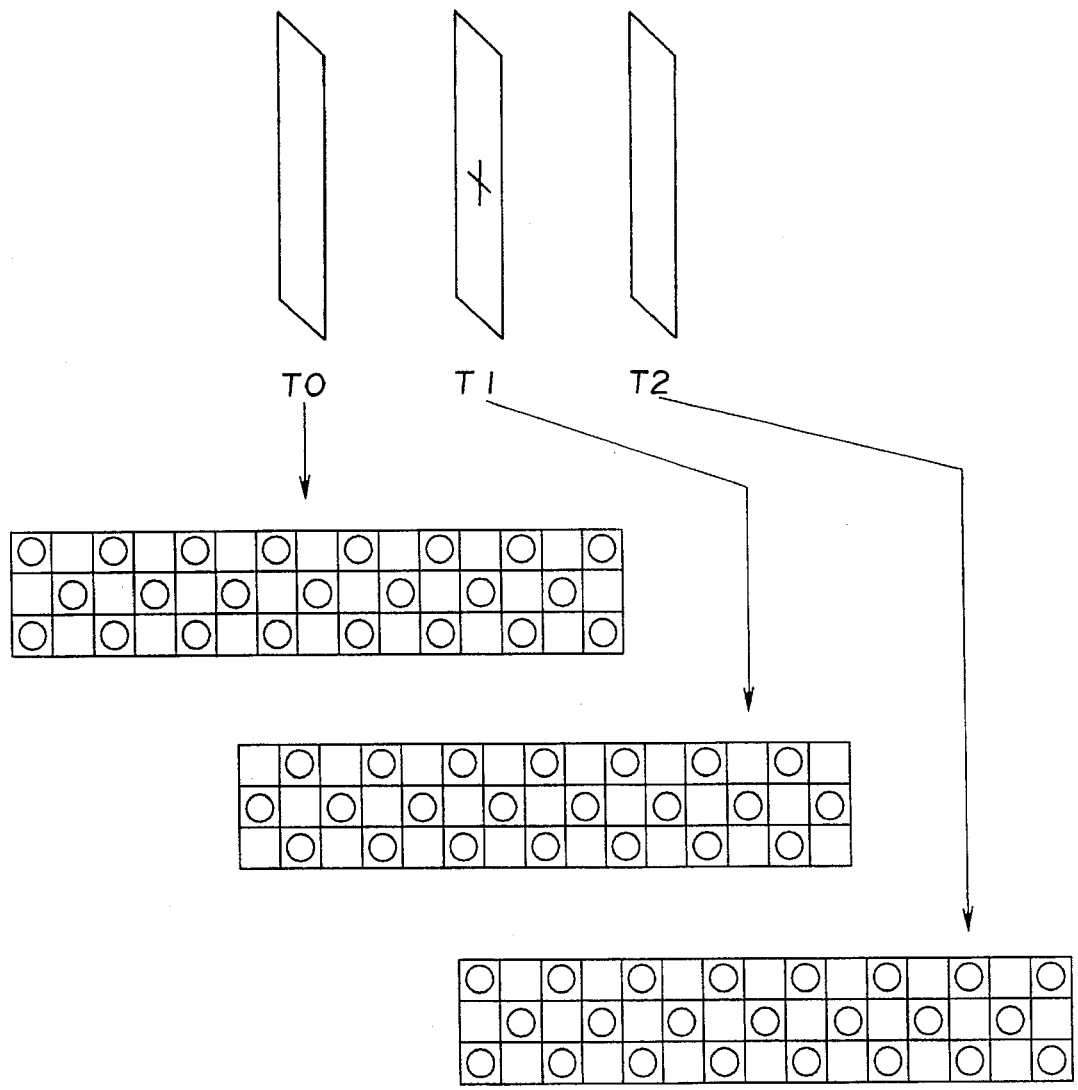
FIG. 10 is a diagrammatic view showing an actual pixel pattern and a pattern of pixels required for coefficient calculation in case the number of taps is increased along the time domain and an offset is made for each frame by way of sub-sampling mainly in the horizontal direction in a checkerboard pattern.

If the number of taps is to be increased along the spatial direction, the three frames T0, T1 and T2 shown in FIGS. 10 and 11 are employed and sub-sampling is performed in a checkerboard pattern with offset for every other frame. For the sub-sampling pattern, a model is presumed in which coefficient calculation is performed in the horizontal direction for accommodating the pictures moved in the horizontal direction, such as panning. For coefficient calculation, 23 pixels are employed for the even frames T0 and T2 and 22 pixels are employed for the odd frames T1. In such case, calculation of a sum total of 68 pixels are employed for calculating the unknown coefficients and the same pixels as those employed for coefficient calculation are transmitted by way of ½ temporal/spatial thinning.

For these models, the models represented by the linear first-order combination, similar to that employed in the previous first embodiment, are employed.

Pixel thinning in time and space may also be undertaken, in which case the pixels thinned to ¼ by thinning ½ as described above and additional thinning in temporal space are transmitted along with the coefficients and the transmitted picture is to be reproduced. The thinning pattern by ¼ is that in which three of the four pixels usually transmitted in the line direction are thinned out as described subsequently. The thinning pattern is a pattern in which a pattern is completed with four fields with an offset from field to field.

Figure 12:
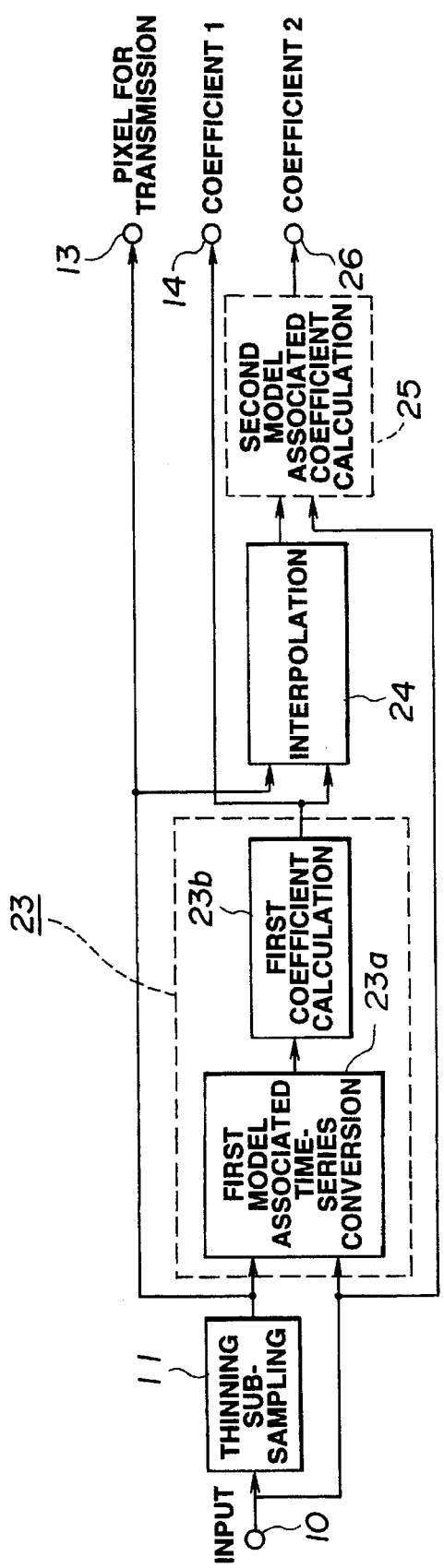
FIG. 12 is a schematic block circuit diagram showing a high efficiency encoding device according to a modification of the present invention.
Figure 13:
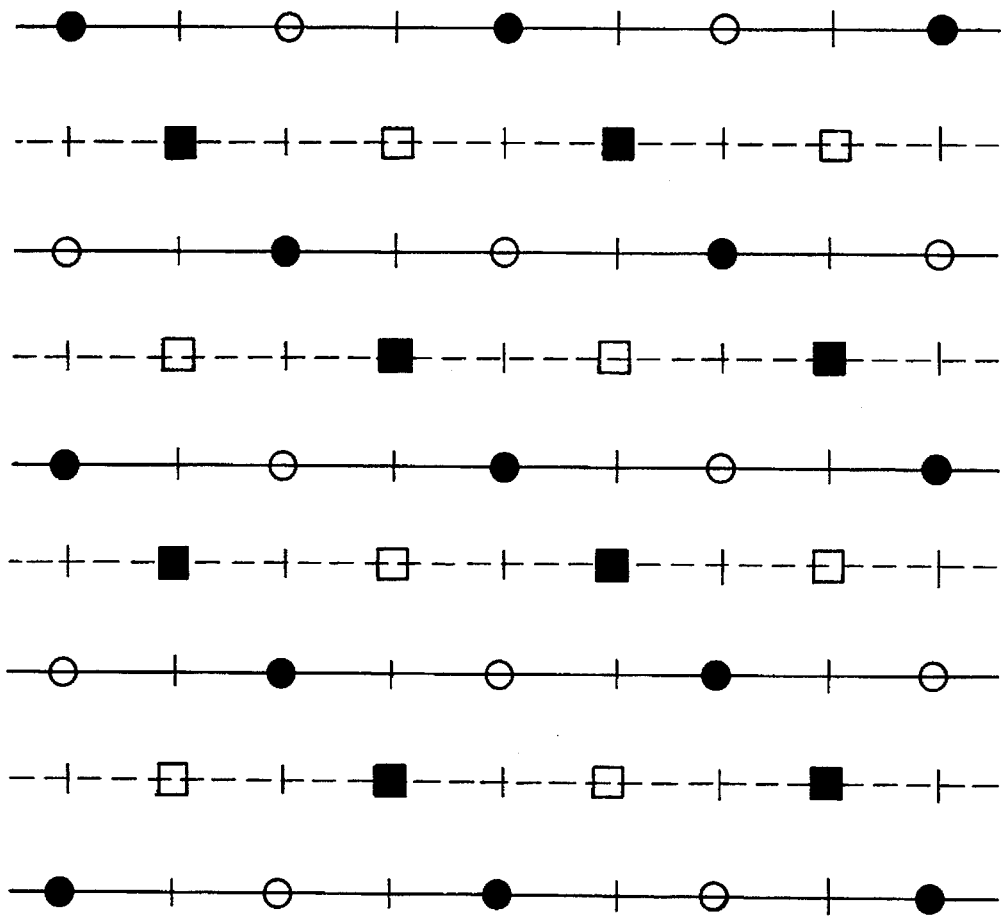
FIG. 13 shows a sampling pattern for the case of ¼ temporal-spatial sub-sampling.
Figure 14:
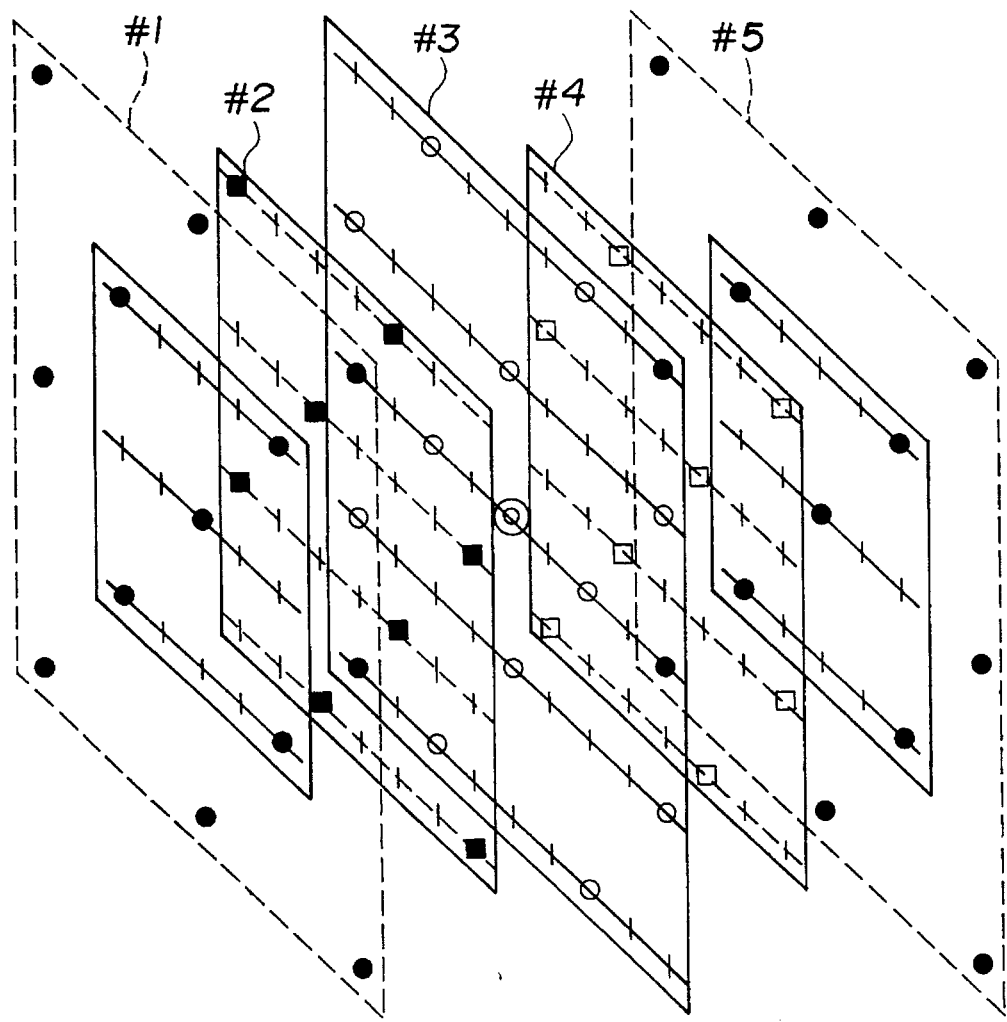
FIG. 14 is a diagrammatic view showing a three-dimensional representation of the sampling pattern shown in FIG. 13.

A high efficiency encoding device employing as shown in FIGS. 13 and 14, the temporal/spatial sampling as described above according to a modification is explained by referring to a schematic block diagram of FIG. 12. The present embodiment is again directed to a picture processing device and parts or components which are used in common as those used in the previously explained high efficiency encoding device are denoted by the same reference numerals and corresponding description is omitted for simplicity. The present high efficiency encoding device illustrates an arrangement for performing ¼ temporal/spatial thinning.

The high efficiency encoding device for performing temporal/spatial sub-sampling and compressing the thinned-out information for information transmission is made up of a thinning sub-sampling unit 11 for thinning the input picture information and outputting the thinned-out information, a first model-associated coefficient calculating unit 23 as unknown coefficient calculating means, an interpolating processing unit 24 as unknown interpolation coefficient calculating means and a second model associated coefficient calculating unit 25. The first model-associated coefficient calculating unit formulates simultaneous equations which will minimize the error between the information of the object pixel of interpolation as obtained from the input information and the results of the interpolating processing by interpolation by an equation of interpolation for finding the information of the thinned-out object pixel of interpolation using the non-thinned out transmission information following the processing by the sub-sampling unit 11, with the coefficients of the equation of interpolation remaining unknown, and solving the simultaneous equations to find the most probable values for the unknown coefficients. The interpolation processing unit 24 formulates simultaneous equations which will minimize the errors between reference information for the object pixel of interpolation and the information concerning the results of interpolation processing obtained by interpolating processing on the information of the object pixel of interpolation which has not been taken as the object of interpolation in the first model-associated coefficient calculating unit 23, using the picture information transmitted from the sub-sampling unit 11 and the input picture information which is the above-mentioned reference information, with the coefficients of the equation of interpolation remaining unknown, and solving the simultaneous equations to find most probable values of the unknown coefficients of interpolation which have not been interpolated. The reference information for the object of pixel interpolation is employed for performing reference comparison of the transmitted information from the thinning sub-sampling unit 11 and the information resulting from calculation of the information for the object of interpolation.

The high efficiency encoding device includes a cascaded connection of the processing units 24 and 25 as one set downstream of the first model-associated coefficient calculating unit 23 for transmitting plural coefficients corresponding to the unknown coefficients and the transmitted information depending on the thinning amount by the sub-sampling unit 11.

The high-efficiency encoding device is not limited to the present embodiment. If a hierarchical structure is employed in which multi-stage thinning processing units are provided in the thinning sub-sampling unit 11 so that the non-thinned out transmission information outputted from a given stage is employed at the next following stage, it is possible to omit the processing unit 24 and to supply the transmitted information to the model-associated coefficient calculating unit related to the temporal-spatial thinning-out amounts.

The first model-associated coefficient calculating unit 23 is made up of a first model-associated time-series transforming unit 23a for extracting sub-samples of the information conforming to a model pre-defined by time-series transformation for preparing normal equations satisfying the conditions for the least squares method, and a first coefficient processing unit 23b for performing coefficient calculation for unknown coefficients based on the picture information from the first model-associated time-series transforming unit 23a. The first coefficient processing unit 23b outputs coefficients 1 resulting from the calculation via an output terminal 14. The first coefficient processing unit 23b also outputs the coefficients 1 resulting from the calculation to the interpolation processing unit 24. Similarly to the first model-associated coefficient calculating unit 23, the second model-associated coefficient calculating unit 25 includes a second model-associated time-series transforming unit 25a and a second coefficient calculating unit 25b, although these units are not shown.

The interconnection of the high efficiency encoding device is explained by referring to FIG. 12.

The picture information corresponding to the input picture is supplied via an input terminal 10 to the thinning sub-sampling unit 11. The picture information is also supplied to the first model-associated time-series transforming unit 23a of the first model-associated coefficient calculating unit 23. The thinning sub-sampling unit 11 outputs the encoded output signals as the transmitted information at the output terminal 13 while transmitting the encoded signals to the first model-associated time-series transforming unit 23a.

The first model-associated coefficient calculating unit 23 performs time-series transformation on the transmission pixels supplied by the first model-associated time-series transforming unit 23a and the input picture and model formulation corresponding to the linear first-order coupled model to generate the normal equations. The first model-associated time-series transforming unit 23a outputs the coefficients of the generated normal equations to the first coefficient calculating unit 23b. The first coefficient calculating unit 23b performs matrix calculation on the unknown coefficients included in the supplied coefficients in accordance with the conditions imposed by the least squares method to output the calculated unknown coefficients at the output terminal 14. The coefficients calculated by the processing operation on the unknown coefficients are the coefficients 1 shown in FIG. 12.

The first coefficient calculating unit 23b transmits the coefficients 1 to the local decoder 24. The local decoder 24 finds the pixels which will be required in the subsequent ½ thinning model by interpolation using the thinned information from the thinning sub-sampling unit 11 and the coefficients 1. The local decoder 24 transmits the interpolated pixels as found to the second model-associated coefficient calculating unit 25. In the present embodiment, the interpolated pixels correspond to the reference information for the object pixel of interpolation.

The picture information supplied at the input terminal 10 is entered to the second model-associated coefficient calculating unit 25. The second model-associated coefficient calculating unit 25 performs time-series processing on the picture information and the interpolated pixels by the first model-associated time-series transforming unit 25a, not shown, and performs a processing operation corresponding to the linear first-order combination model from the processed information to formulate normal equations and the coefficients 1 constituting the normal equations are outputted to the second coefficient calculating unit 25b, not shown. The second coefficient calculating unit 25b calculates coefficients 2 as unknown coefficients corresponding to the linear first-order combination model to output the coefficients 2 at an output terminal 26.

Referring to FIGS. 13 and 14, the operating principle of the high efficiency encoding device is explained.

Each horizontal line in FIG. 13 represents a scanning line for interlaced scanning. The thinning pattern is completed by four fields in the present embodiment and represents odd and even field which stand for the four fields, with the odd field and the even field being shown on the same scanning lines by the solid and broken lines, respectively. The transmitted pixels in each of these fields are indicated by O, ◐, □ and ■ for the first field #1, second field #2, third field #3 and the fourth field #4, respectively. It will be seen from FIG. 13 that the pixels of the respective sampled and transmitted samples are arrayed in a checkerboard pattern and offset on the field basis.

FIG. 14 shows the sampling pattern shown in FIG. 13 in a three-dimensional configuration. The sampling pattern shown in FIG. 14 indicates that three of normally transmitted four pixels are thinned out in the line direction. The linear first-order combination model employed herein is such a model in which five fields are employed for constructing the model and coefficient calculation is performed on the field basis to find the unknown coefficients for the pixel to be interpolated. With the present model, the transmitted pixels, temporally and spatially thinned out by ¼ as described above, are supplied on the field basis and the five-field transmitted pixels within a solid-line rectangle are employed for calculating unknown coefficients for finding the center pixel indicated by double circles as the pixel to be interpolated.

Meanwhile, the pixels encircled by a broken-line rectangle broader than the solid-line rectangle, as indicated by fields #1 and #5, may be employed in the present model as the pixels employed in calculating the unknown coefficients. However, in such case, the number of the coefficients to be calculated is increased.

The pixels not thinned out subsequent to the thinning by the sub-sampling unit 11 shown in FIG. 12 are supplied in accordance with this model to the first model-associated time-series transforming unit 23a of the first model-associated time-series coefficient calculating unit 23.

The transmission pixels supplied via the input terminal 10 are also supplied to the first model-associated time-series transforming unit 23a which then finds normal equations associated with the model based on the data supplied thereto to output the coefficients of the normal equations to the first coefficient calculating unit 23b. Based on these coefficients, the first coefficient calculating unit 23b performs a matrix operation to output the coefficients 1 as the most probable values which minimize the residues. The coefficients 1 are employed for the estimation of the center pixel in the ¼ thinning.

The coefficients 1 and the output of the thinning sub-sampling unit 11 are supplied to the local decoder 24. The local decoder 24 calculates the pixels to be interpolated in the model to supply the calculated pixel to be interpolated to the second model-related time-series transforming unit 25. The normal equations associated with the linear first-order combination model for ½ thinning are found by the second model-related time-series transforming unit 25. The coefficients thus found are transmitted to the second coefficient calculating unit. The coefficients 2, which are unknown coefficients, are then found using the coefficients found by the least squares method by the second coefficient calculating unit (not shown). The coefficients 2 used for estimating pixels on both sides of the center pixel in ½ thinning are outputted via the output terminal 26. The present high efficiency encoding device then outputs the thinned-out transmission pixels, coefficients 1 and 2 to effect high compression ratio transmission.

Figure 15:
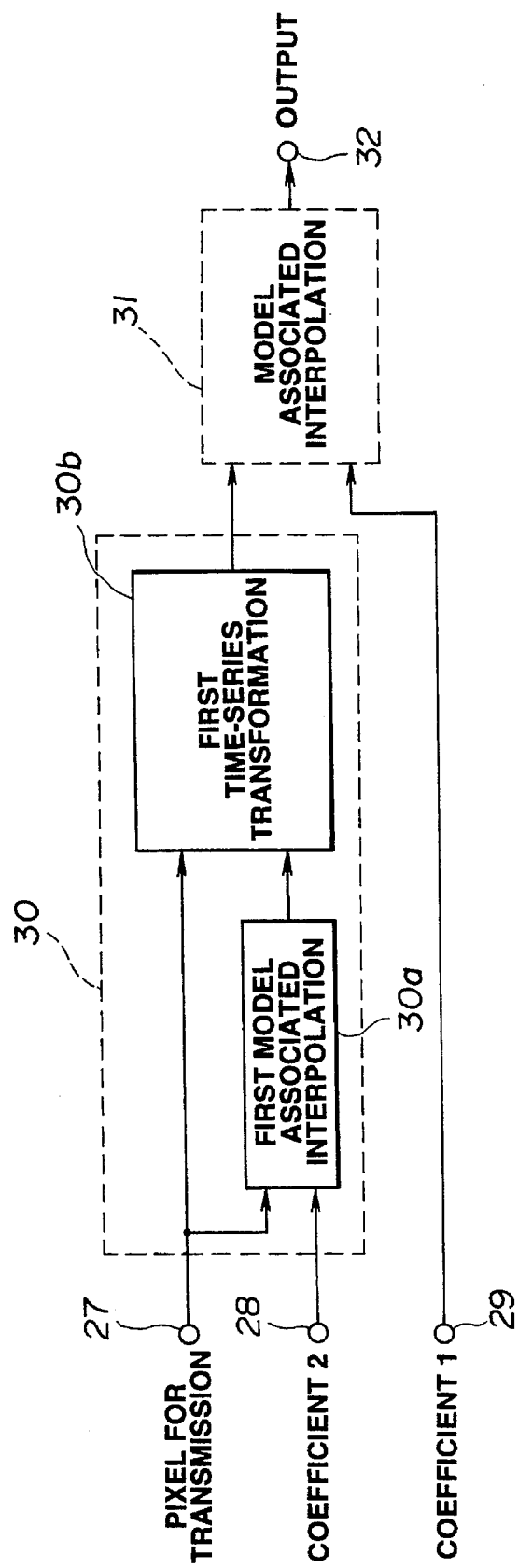
FIG. 15 is a schematic block circuit diagram showing a high efficiency decoding device according to a modification of the present invention.

FIG. 15 shows, in a block diagram, an arrangement of a high efficiency decoding device in which the transmission information, such as the information on the object pixel of interpolation thinned out by temporal/spatial sub-sampling, and the coefficients 1 and 2 are entered as the reception information and processed with interpolation for restoring the original information from the reception information. The cascaded multi-stage interconnection herein is the two-stage interconnection by employing the two sets of the coefficients, that is, the coefficients 1 and 2.

The high efficiency decoding device includes a first model-associated interpolating processing unit 30a and a first time-series transforming unit 30b as time-series transforming means for transforming the information of the object pixel of interpolation generated in the first model-associated interpolating unit 30a and the received information into the time-series information corresponding to the pre-transmission information. The first model-associated interpolating processing unit 30a is the interpolating means for generating the information of the object of interpolation using the thinned information in the received information and one of the coefficients determined in association with the unknown coefficients in the equation of interpolation for finding the information of the object of interpolation.

Although not shown, the second model-associated interpolating unit 31 is made up of a second model-associated interpolating unit and a second time-series transforming unit.

In effect, the high efficiency decoding device shown in FIG. 15 is made up of a multi-stage cascaded connection of a first model-associated interpolating processing unit 30 and a second model-associated interpolating processing unit 31. The first model-associated interpolating unit 30 is a first model-associated interpolating means for recovering the reception information using the transmission information in the reception information and the coefficients 2 which correspond to the unknown coefficients in the transmitted model and which represent the coefficients during ¼ temporal/spatial sub-sampling. The second model-associated interpolating processing unit 31 is the second model-associated interpolating means adapted for performing model-associated interpolation for recovering the reception information using the interpolation information generated in the first model-associated interpolating unit 30 and the coefficients 1 which correspond to the unknown coefficients in the transmission model and which represent the coefficients 1 during ½ temporal/spatial sub-sampling.

With the high efficiency decoding device shown in FIG. 15, the thinned out transmission pixels are entered at an input terminal 27 to a first time-series transforming unit 30b and a first model-associated interpolating unit 30a in the first model-associated interpolating unit 30. The coefficients 2 are entered via an input terminal 28 to the first model-associated interpolating unit 30a. The first model-associated interpolating unit 30a performs interpolation corresponding to the linear first-order combination model and outputs the interpolated pixel thus found out to the first time-series transforming unit 30b.

The first time-series transforming unit 30b performs time-series transformation on the transmission pixels and the interpolated pixels to transmit the processed pixels to model-associated interpolating processing unit 31, The second model-associated interpolating processing unit 31 performs the processing associated with the linear first-order combination model for ½ thinning on the coefficients 1 supplied via the input terminal 29 and an output of the first time-series transforming unit 30b, The unit 31 also performs time-series transformation thereon in the first model-associated interpolating unit 30a, for outputting a picture which is free from picture quality deterioration and which is extremely close to the original picture.

The interpolating processing unit which performs such interpolating operation has a double-stage cascaded structure for calculating the coefficients for calculating the pixels of the information of the object of interpolation in the ¼ temporal/spatial thinning and ½ temporal/spatial thinning at the encoder side for performing hierarchical interpolation from the transmitted pixels of the ¼ temporal/spatial thinning. The decoder side arrangement is connected to the two-stage cascaded construction for finding the information of the object pixel of interpolation of each hierarchy for restoring the picture. By the interpolation, the restored picture is substantially free from picture quality deterioration by the operation of interpolation despite the hierarchical interpolation.

The re are two methods for producing a restoration picture substantially free from picture quality deterioration by interpolation from a transmitted picture which has been compressed by temporal/spatial sub-sampling. That is, there is a method of interpolating the center pixel and left and right side pixels by the arrangement of the high efficiency encoding and decoding devices shown in FIGS. 1 and 3, respectively, using three sets of coefficients, by way of direct interpolation, while there is a method of interpolating a center pixel by the arrangement of the high efficiency encoding and decoding device shown in FIGS. 2 and 15 and of interpolating the center pixel by ½ thinning linear combination model using two sets of coefficients, by way of hierarchical interpolation. It is possible with these methods to produce restoration pictures substantially free from picture quality deterioration by interpolation of non-transmitted pixels by the interpolation, as will become clear from the above-described embodiments.

In the above-described embodiments, the temporal/spatial thinning for hierarchical interpolation in the above-described embodiments of the high efficiency encoding and decoding devices, the temporal/spatial thinning is set to ¼ and implemented by the two-stage cascaded connection. The present invention is not limited to such arrangement and it suffices to provide an n-stage cascaded connection necessary for the hierarchical interpolation for $½_n$ temporal/spatial thinning, with n being 1, 2, ⋯ . The compression ratio for the transmission information may be increased further by increasing the number of stages of the cascade connection.

By forming a linear first-order combination model from the pixel to be interpolated and the transmitted pixels at the encoder side, employing the coefficients associated with the model as the unknown coefficients of the normal equations generated by the least squares method, calculating the most probable value and by transmitting the coefficients and the transmission pixels corresponding to the model suited to the picture of the object of transmission, it becomes possible to achieve transmission at a high compression ratio.

On the other hand, by estimating the interpolated pixel by direct interpolation, interpolation of hierarchical structure or the like in dependence upon the linear first-order combination model from the transmission pixels and the coefficients at the decoder side, it becomes possible to produce an interpolated picture which is substantially free from deterioration picture quality and which is extremely close to the original picture as compared to the picture obtained by uniform filtering according to the conventional practice. In this manner, the original picture may be transmitted with a high compression ratio to produce an interpolated picture which is substantially free from picture quality deterioration.

What is claimed is:

1. A high efficiency encoding device for performing temporal/spatial sub-sampling on input information and compressing resulting thinned information to transmit resulting compressed information, comprising:

thinning means for thinning the input information by performing temporal/spatial sub-sampling and outputting resulting thinned information while omitting thinned-out information that is not sub-sampled from the input information;

first calculating means for calculating a first plurality of unknown coefficients of interpolation by solving first simultaneous equations for minimizing errors between information of an object of interpolation and information concerning results of interpolation using an interpolation equation for restoring the thinned-out information from the information not thinned out by the thinning means, with the coefficients of the interpolation equation remaining unknown, and solving the first simultaneous equations to determine most probable values of said first plurality of unknown coefficients, wherein determined values of said first plurality of unknown coefficients are reference information of the object of interpolation;

second calculating means for calculating a second plurality of unknown coefficients of interpolation by determining most probable values of said second plurality of unknown coefficients, said second calculating means solving second simultaneous equations for minimizing errors between the reference information of the object of interpolation to be compared to the information of the object of interpolation and the information concerning the results of interpolation obtained by using the interpolation equation, generating information of the object of interpolation which has not been generated for the object of interpolation by said first calculating means, using the thinned information from said thinning means and said reference information of the object of interpolation, with the coefficients of the interpolation equation remaining unknown, and solving the second simultaneous equations to determine the most probable values of said second plurality of unknown coefficients, said first calculating means being connected in a cascaded manner upstream of said second calculating means for calculating the unknown coefficients depending on the thinning performed by said thinning means; and transmission means for transmitting a plurality of coefficients corresponding to said first and second plurality of unknown coefficients of interpolation and the thinned information output by said thinning means.

2. A high efficiency decoding device for restoring original information by interpolating information concerning an object of interpolation based on received information containing transmitted pixels and transmitted coefficients associated with an interpolation equation having unknown coefficients, said transmitted pixels representing information to be interpolated having been thinned out by temporal/spatial sub-sampling, comprising:

interpolation processing means for generating the information concerning the object of interpolation by substituting the transmitted pixels which have not been thinned out and a selected one of different groups of coefficients within the transmitted coefficients corresponding to the unknown coefficients of the interpolation equation into said interpolation equation; and time-series transforming means for transforming the information concerning the object of interpolation and said received information into time-series information substantially identical to the original information, wherein said interpolation processing means and the time-series transformation means are connected in cascade as one of a number of sets, the number of sets depending on the number of the different groups of coefficients used, and the original information is restored by employing a successive one of the different groups of coefficients with a successive one of the sets for calculating a corresponding information concerning the object of interpolation.

3. A high efficiency encoding and decoding device for performing temporal/spatial sub-sampling on input information, compressing sampled information, transmitting compressed information, receiving compressed information and interpolating received information for restoring the input information, comprising:

thinning means for thinning the input information by performing temporal/spatial sub-sampling and outputting thinned information while omitting thinned-out information not sub-sampled from the input information;

first calculating means for calculating a plurality of unknown coefficients by solving first simultaneous equations for minimizing errors between information of an object of interpolation derived from the input information and a result of interpolation using an interpolation equation for restoring the thinned-out information using the information not thinned out by the thinning means, with coefficients of the interpolation equation remaining unknown, and solving the first simultaneous equations to determine most probable values of said first plurality of unknown coefficients, in which determined values of said first plurality of unknown coefficients are reference information of the object of interpolation;

second calculating means for calculating a second plurality of unknown coefficients of interpolation by determining most probable values of the second plurality of unknown coefficients of interpolation, said second calculating means solving second simultaneous equations for minimizing errors between the reference information to be compared to the information of the object of interpolation and the result of interpolation, generating information of the object of interpolation which has not been generated by said first calculating means, using the information from said thinning means and said reference information of the object of interpolation, with the coefficients of the interpolation equation remaining unknown, and solving the second simultaneous equations to determine the most probable values of said second plurality of unknown coefficients of interpolation, said first calculating means being connected upstream of said second calculating means in a cascaded manner depending on an amount of thinning performed by said thinning means;

transmission means for transmitting a plurality of coefficients corresponding to said first and second plurality of unknown coefficients and the thinned information;

interpolation processing means receiving said thinned information and said plurality of coefficients from said transmission means for generating the information of the object of interpolation using said thinned information and one of different groups of coefficients within the transmitted coefficients; and time-series transforming means for transforming the information of the object of interpolation and said thinned information into time-series information substantially identical to the input information, wherein said interpolation processing means and the time-series transforming means are connected in cascade as one set from a number of sets, the number of sets used depending on the number of different groups of coefficients, and the input information is restored by employing a successive one of the different groups of coefficients with a successive one of the sets for calculating a corresponding part of the information of the object of interpolation.

4. The high efficiency encoding and decoding device according to claim 3 wherein said plurality of unknown coefficients are found as a result of addition of the information concerning the results of interpolation processing represented by the linear first-order combination of the information output by said thinning means and unknown coefficients and residues between the information concerning the results of interpolation and the information of the object of interpolation derived from the input information by the least squares method which minimizes the residues.

* * * * *